J. O. NEIKIRK.
DRAFT GEAR FOR RAILROAD CARS.
APPLICATION FILED APR. 9, 1917.
1,251,911.
Patented Jan. 1, 1918.
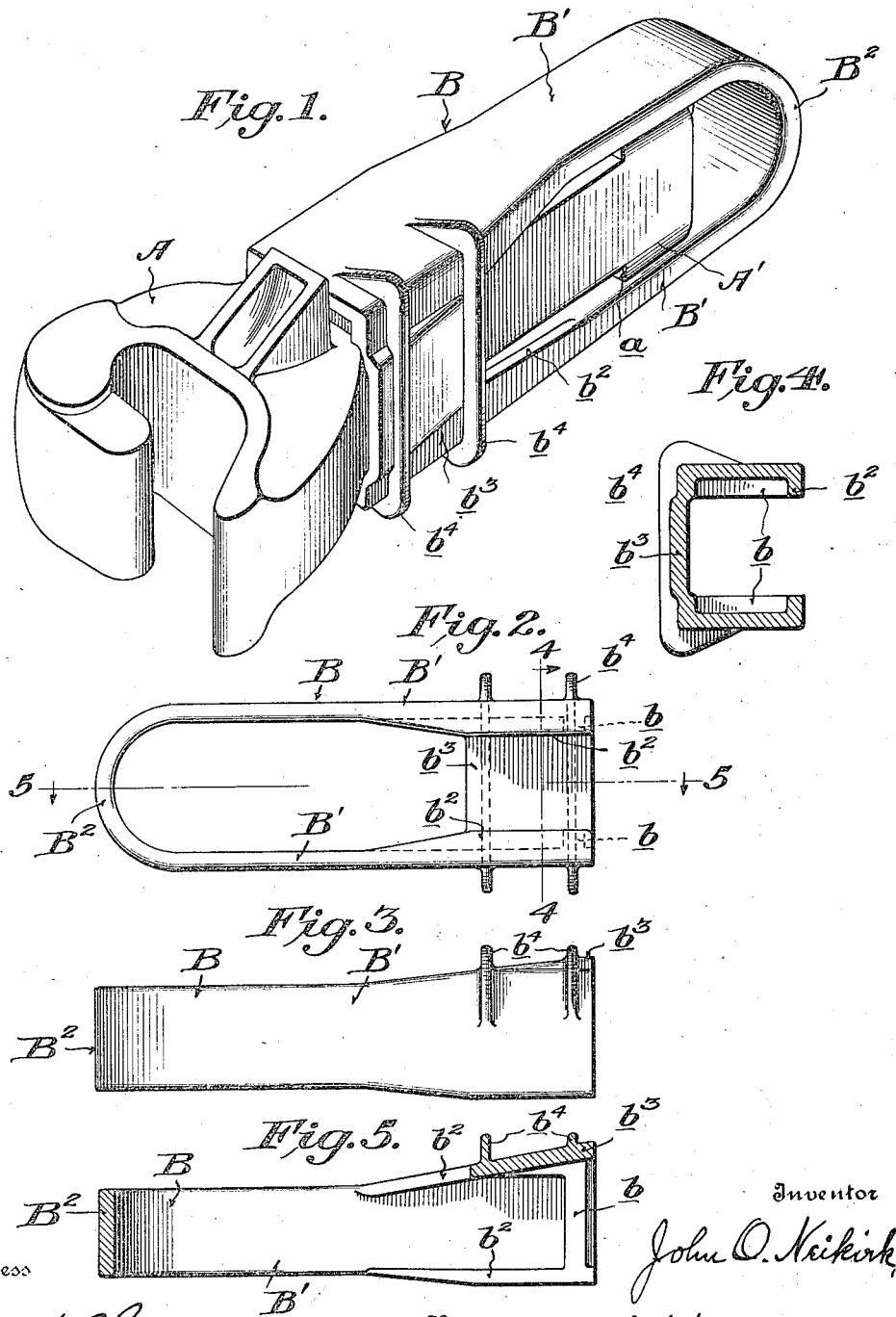

UNITED STATES PATENT OFFICE.

JOHN O. NEIKIRK, OF LOMBARD, ILLINOIS.

DRAFT-GEAR FOR RAILROAD-CARS.

1,251,911.　　　　Specification of Letters Patent.　　Patented Jan. 1, 1918.

Application filed April 9, 1917. Serial No. 160,706.

*To all whom it may concern:*

Be it known that I, JOHN O. NEIKIRK, a citizen of the United States, and a resident of Lombard, in the county of Dupage and State of Illinois, have invented certain new and useful Improvements in Draft-Gears for Railroad-Cars, of which the following is a specification.

My invention relates to draft gear and has for its objects to provide an improved connection between the draft yoke and the coupler so as to enable the coupler to be readily and quickly connected to the yoke, to simplify this connection, and to make a connection which can be used with any standard form of coupler. My invention consists in the features of construction hereinafter described and pointed out in the claims.

In the drawings, Figure 1 is a perspective view showing the coupler inserted in the yoke ready to be drawn forward. Fig. 2 is a side elevation view of the yoke. Fig. 3 is a plan view. Fig. 4 is a transverse section on the line 4 of Fig. 2. Fig. 5 is a longitudinal section on the line 5—5 of Fig. 2.

Referring to the drawings, A indicates the coupler, which may be of any suitable standard type having the usual enlarged portion A' at its inner end. B is the yoke which comprises a single integral casting having the parallel top and bottom members B' connected together at their rear ends by the curved portion B² and spaced apart at their forward ends to permit the passage of the drawbar or coupler shank. As is usual, the enlarged portion A' of the coupler is wider than the shank so as to form the shoulders $a$ which when the coupler is in its forward position abut against the inner sides of the transverse inwardly extending flanges $b$ formed integrally with the forward ends of the yoke. The forward portions of the yoke members are also provided with inwardly extending longitudinal flanges $b^2$ shown in the present exemplification of my invention as parallel flanges along the sides of the yoke members. The vertical distance between the inner edges of the flanges $b^2$ is such as to permit the lateral insertion of the coupler shank between the yoke members but prevent the lateral passage of the enlarged portion A' of the coupler at this point, while the space between the yoke members rearwardly of these flanges $b^2$ is such as to permit the lateral insertion of the enlarged portion of the coupler shank. From this construction it follows that the coupler may be inserted laterally into the yoke as shown in Fig. 1. The coupler is then pulled forward so that the shoulders $a$ of the enlarged end portion contact with the flanges $b$ of the yoke, at which time the enlarged portion will be held between the flanges $b^2$ of the yoke. Any suitable form of draft gear may then be inserted in the yoke between the inner end of the enlarged portion and the rear of the yoke, as is well understood in this art.

It is necessary in devices of this kind that some means be provided for preventing the spread of the forward ends of the yoke members. For this purpose I provide on one side of the yoke at its forward end the integral plate $b^3$ connecting the opposite flanges $b^2$. This plate may be further strengthened by the transverse ribs $b^4$ extending across the face of the plate and around the upper and lower surfaces of the yoke as shown. It will thus be seen that the plate $b^3$ connects the yoke arms upon one side to prevent the spreading of the yoke members on that side while the reinforcing ribs $b^4$ integral with the plate and with the upper and lower surfaces of the yoke members tend to resist the spreading of the yoke members upon the side opposite the plate. Prior to my invention, it has been endeavored to prevent the spread of the yoke ends by rivets passing through the yoke ends and coupler shank, or by strengthening the yoke members by means of longitudinal ribs or flanges extending around the rear of the yoke members, or by movable reinforcing devices at the ends of the yoke members. Such strengthening means, however, involve the use of large amounts of metal adding greatly to the weight and cost of the yoke, or the use of detachable parts or rivets, adding to the difficulties and cost of construction. By my construction I have given the necessary strength at a point where it is needed without the use of more metal than is necessary and have greatly simplified the shop work and the work of assembling, because the entire yoke is cast as a single piece and requires no additional parts for its connection to the coupler.

From the above description, it will be noted that I have provided a construction in which any standard form of coupler may be quickly inserted into the yoke laterally and connected to the yoke by a simple longitudinal movement.

It is of great importance in devices of this kind that standard dimensions be adhered to, since these dimensions are specified by the Master Car Builders' Association and are universally adhered to by railroads. It is essential, therefore, to avoid any change in the coupler and yoke which would cause a departure from standard dimensions. This I have done by my present invention.
I am aware that prior to my invention it has been proposed to make detachable connections between the yoke and coupler of the draft gear, but so far as I am aware these connections have either employed keys or wedges or other parts which add to the complexity of the connection and the difficulty of making these connections readily and quickly, or they have required the use of some peculiar interlocking forms upon the coupler head to engage corresponding parts upon the yoke so as to necessitate a departure from the standard Master Car Builders' requirements and the universally accepted railroad practice. Such constructions have made it impossible to replace a broken coupler except with one of the same kind adapted to fit the yoke. With my construction it is possible to use any standard form of coupler with my yoke and vice versa, so that when replacement becomes necessary it may be quickly done with whatever standard replacement part happens to be at hand.

I have shown and described one exemplification of my invention. I do not wish, however, to be understood as limiting my invention except as pointed out in the claims.

What I claim is:

1. A draft gear comprising a yoke and a coupler, integral parts upon the yoke and coupler adapted for interlocking engagement upon longitudinal movement of the coupler in the yoke, a member connecting the forward ends of the yoke members at one side, a mass of metal on the outside face of said connecting member and overlying a yoke member, all of said parts being an integral casting.

2. A draft gear comprising a yoke and a coupler, integral parts upon the yoke and coupler adapted for interlocking engagement upon longitudinal movement of the coupler in the yoke, a plate integral with the forward ends of the yoke members connecting the yoke members on one side of the yoke and strengthening ribs each rib being integral with said plate and both yoke members.

JOHN O. NEIKIRK.

Copies of this patent may be obtained for five cents each, by addressing the "Commissioner of Patents, Washington, D. C."